United States Patent [19]
Ohnami et al.

[11] Patent Number: 6,023,539
[45] Date of Patent: Feb. 8, 2000

[54] CODE READING APPARATUS HAVING OPTIMAL BATTERY VOLTAGE DETECTION FUNCTION

[75] Inventors: Yoshikazu Ohnami, Hachioji; Takeshi Mori, Machida; Akira Matsueda; Akira Matsui, both of Hachioji, all of Japan

[73] Assignee: Olympus Optical Co., Ltd., Tokyo, Japan

[21] Appl. No.: 09/187,774

[22] Filed: Nov. 6, 1998

[30] Foreign Application Priority Data

Nov. 17, 1997 [JP] Japan ................................. 9-314777
Aug. 18, 1998 [JP] Japan ................................. 10-231392

[51] Int. Cl.[7] .............................. G06K 9/20; H04N 1/32
[52] U.S. Cl. ........................................... 382/317; 358/468
[58] Field of Search .................................... 358/474, 479, 358/475, 448, 443, 401, 421, 468; 382/312, 313, 314, 315, 317

[56] References Cited

U.S. PATENT DOCUMENTS 5,878,395  3/1999  Bennett ................................... 704/275

FOREIGN PATENT DOCUMENTS 0 670 555 A1   9/1995   European Pat. Off. ......... G06K 1/12
3-253828      11/1991   Japan ............................... G03B 7/26

*Primary Examiner*—Jerome Grant, II
*Attorney, Agent, or Firm*—Frishauf, Holtz, Goodman, Langer & Chick, P.C.

[57] ABSTRACT

An illumination section illuminates a code on a recording medium, on which data about audio information is recorded as an optically readable code, by repeatedly emitting light at predetermined intervals. An image sensing section receives each of light beams reflected by the recording medium including the code illuminated by the illumination section in a read/scan operation for the code, and outputs a corresponding image sensing signal. A signal processing section decodes the data about the audio information by processing the image sensing signal output from the image sensing section. A reproduction output section reproduces the audio information on the basis of the data decoded by the signal processing section and outputs the information. A supply voltage detection section detects a supply voltage to a power supply circuit system including a battery used as a power supply of the apparatus. A detection timing control section controls the supply voltage detection section to detect the supply voltage at a predetermined timing in image sensing operation performed by the image sensing section at the time of light emission after the supply voltage to the power supply circuit system is turned on by a power switch and first light emission is performed by the illumination section.

26 Claims, 8 Drawing Sheets

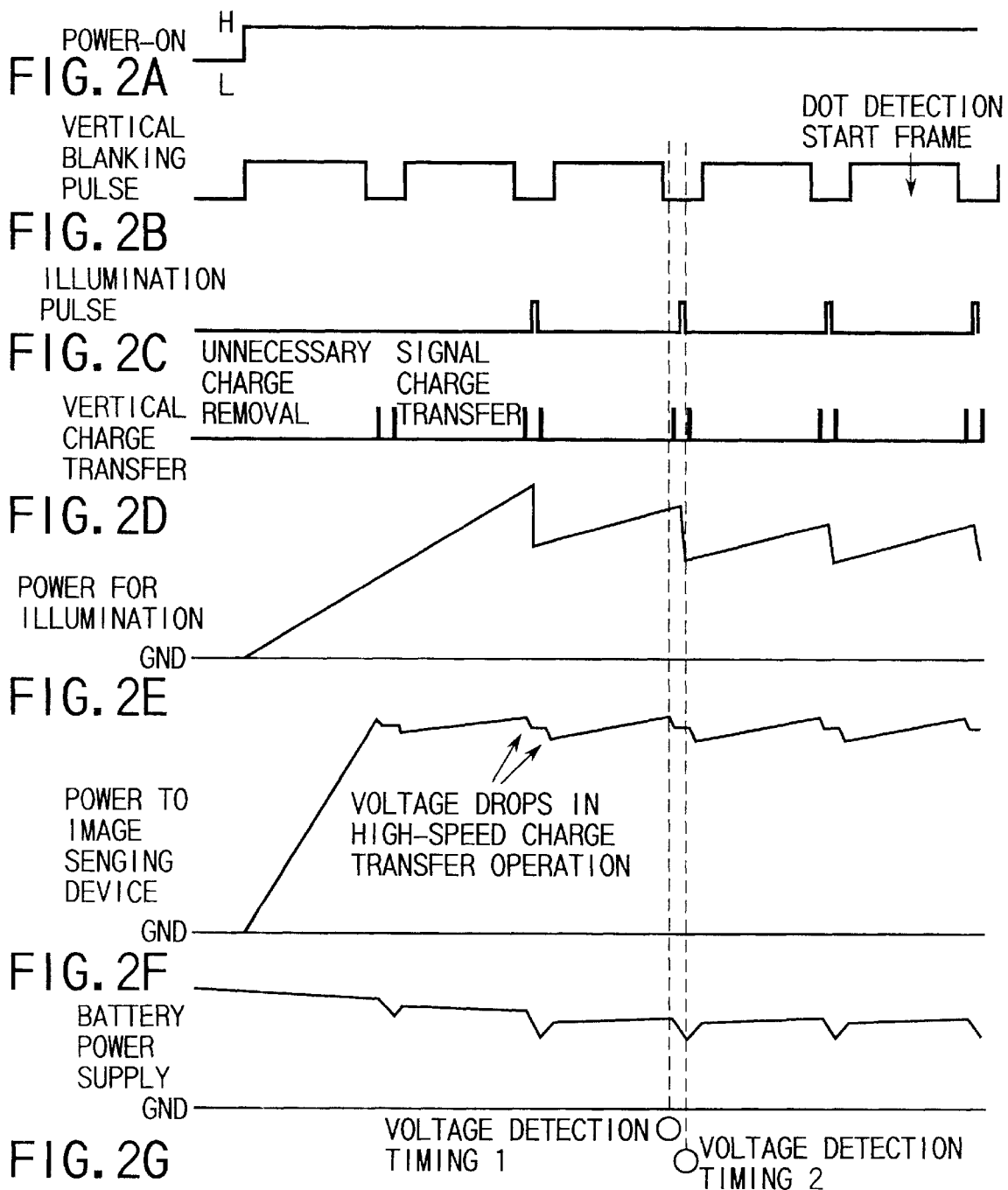

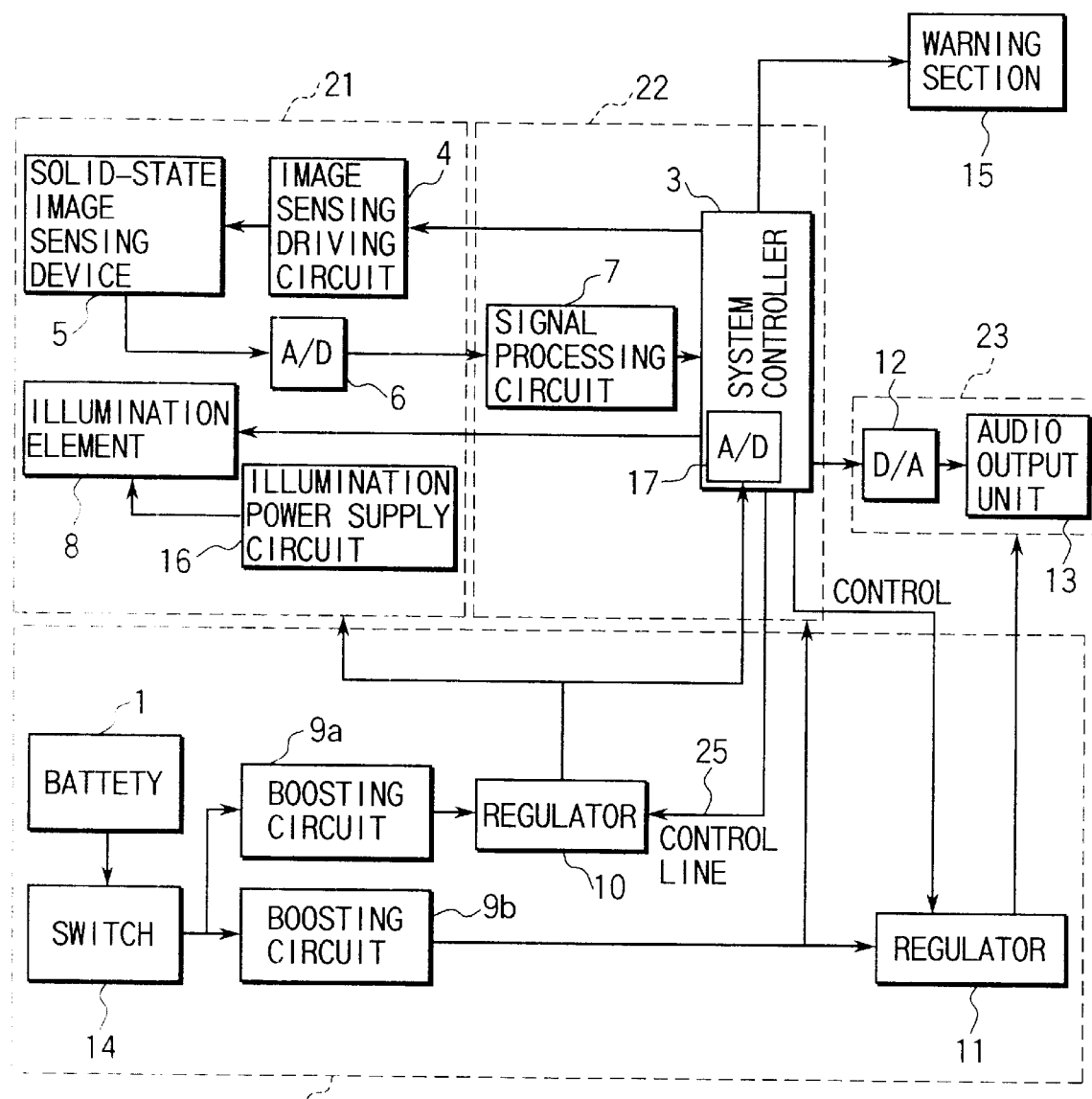
FIG. 5
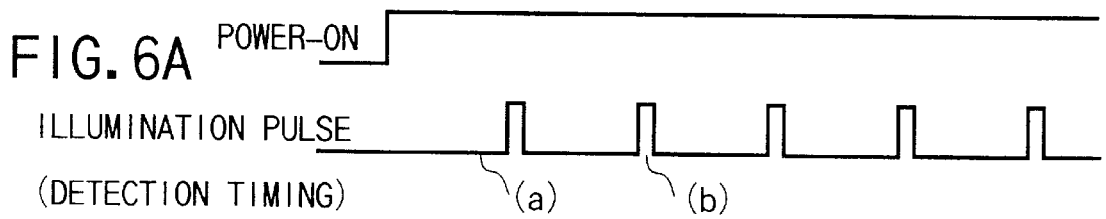
FIG. 6A
FIG. 6B

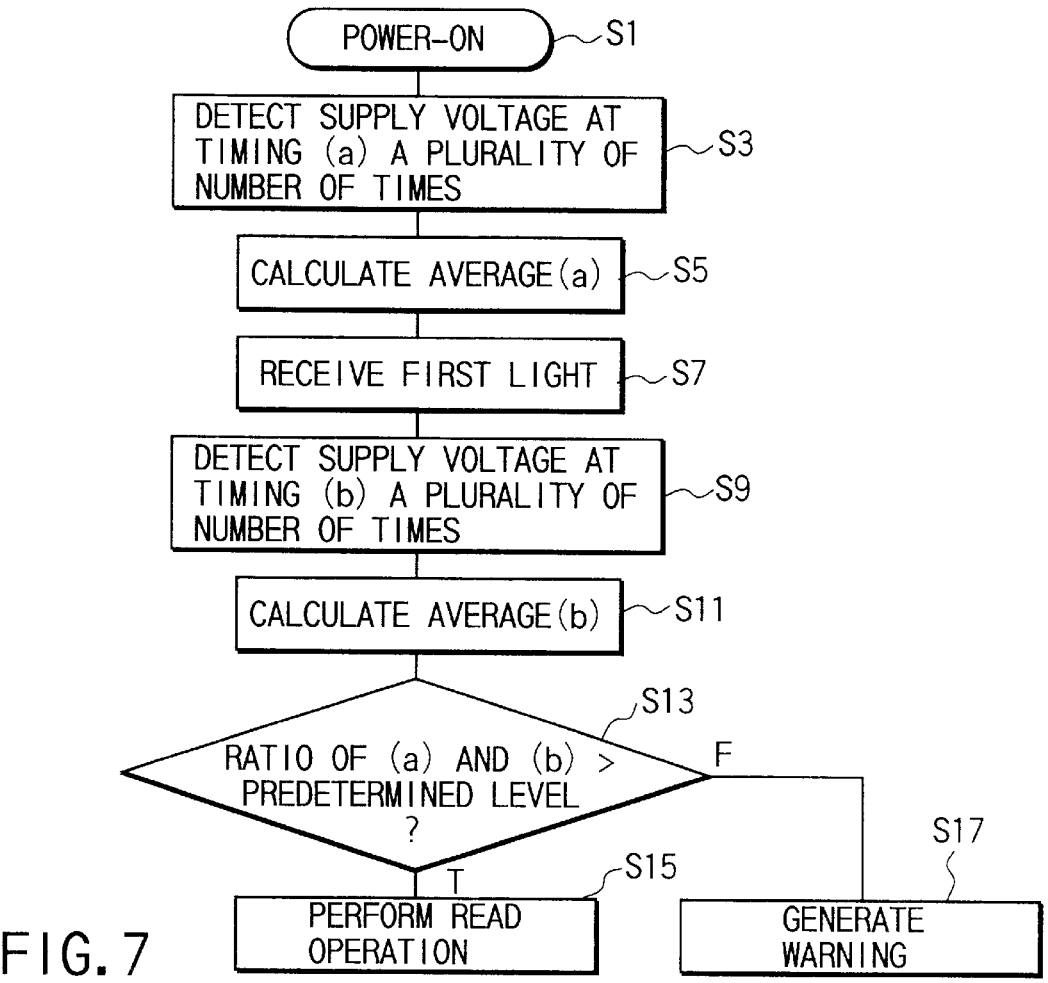

CODE READING APPARATUS HAVING OPTIMAL BATTERY VOLTAGE DETECTION FUNCTION

BACKGROUND OF THE INVENTION

The present invention relates a code reading apparatus for optically reading a code on a recording medium on which data about audio information and the like is printed/recorded as an optically readable code.

A code reading apparatus like the above one proposed by the assignee of the present invention is disclosed in Jpn. Pat. Appln. KOKAI Publication No. 6-231466 (EP No. 0,670, 555A1), which includes a dot code as a code obtained by printing/recording data about audio information, video information, text data, and the like on a printing medium such as a paper sheet in an optically readable form, and a code reading apparatus that is manually operated to scan the dot code to optically read it, and reproduces/outputs information such as original audio information.

FIGS. 9A and 9B show the physical format of the dot code.

A plurality of blocks 30 are two-dimensionally arranged side by side to form a dot code 31. Each block 30 is composed of a data area 32 in which part of data about audio information or the like which corresponds to one of the blocks obtained by dividing the data is present as a dot image made up of white or black dots, each corresponding to "0" or "1", in a predetermined form, makers 33, each having a predetermined number of consecutive black dots, arranged on the four corners of the block 30 to be used to detect a reference point for detection of the respective dots in the data area 32, and block address patterns 34 that include error detection or error correction codes and are arranged between the markers 33 to identify each block 30 when the above different blocks 30 are read.

Note that the lines drawn in the form of a matrix are imaginary lines expressing the matrix.

Assume that the size of the image sensing plane of a solid-state image sensing device of a reading apparatus is smaller than the overall size of a dot code having such a physical format, i.e., the whole dot code cannot be sensed by the solid-state image sensing device with one shot. Even in this case, if the address assigned to each of the above blocks can be read and recognized, the original data can be decoded from the data of the respective blocks on the basis of the addresses. Consequently, a large amount of data that cannot be expressed by a known one- or two-dimensional bar code can be held on a paper sheet or the like. This technique facilitates data transfer through media such as a paper sheet, and hence is expected to have a variety of applications that are not conceivable in the prior art.

The above code reading apparatus used in this case performs so-called pulse emission, i.e., repeatedly emitting light at predetermined intervals by using an illumination means such as an LED in read/scan operation. Since the exposure time in image sensing operation is substantially determined by the emission intervals, various problems in read operation due to the influences of camera shake and the like can be solved, thus providing advantages in read operation by manual scanning.

In a code reading apparatus of this type, since a compact battery is used as a power supply, a battery voltage detection function is indispensable as in other types of electronic devices using compact batteries.

In addition, an LED or the like used as the above illumination means and the solid-state image sensing device consume a large amount of current, and the current consumption of the apparatus sequentially changes in its operation sequence.

In general, when the battery voltage of an electronic device using a compact battery is to be detected, the degree of consumption of the battery is detected after the power is turned on, and the user is immediately warned of the detection result.

As shown in FIG. 10, the voltage of a battery 1 is monitored by a voltage detection circuit 2 through a power switch 14. When the monitored voltage becomes equal to or lower than a predetermined level, the voltage detection circuit 2 outputs an L-level signal. Upon reception of this signal, a system controller 3 warns the user of this state.

With this operation, the user can check the degree of battery consumption before he/she uses the electronic device.

In the apparatus disclosed in Jpn. Pat. Appln. KOKAI Publication No. 3-253828, a camera battery checking unit includes a battery voltage determination control means for operating a battery voltage determination means a lapse of a predetermined period of time after a shift from the operation mode to the standby mode.

According to this apparatus, even if a warning is displayed in the operation mode, when the battery is restored after a lapse of a certain period of time, the warning display is updated and erased in the standby mode. In addition, since long battery check intervals can be set in the standby mode, unnecessary consumption of power for battery checks can be prevented.

It is, however, not easy to directly apply a battery voltage detection function like the one shown in FIG. 10 to a code reading apparatus for optically reading a dot code like the one described above and reproducing/outputting the original audio information or the like for the following reason.

A code reading apparatus of this type consumes a large amount of current, as described above. In order to save power, therefore, this apparatus uses a sequence of setting a standby state before scanning and after the code is scanned and the audio information or the like is reproduced/output.

FIGS. 11A and 11B show the relationship between the operation state of the code reading apparatus and changes in battery voltage level.

As shown in FIGS. 11A and 11B, in the standby state, since the load is light, the battery voltage is maintained high. In the scan state, however, since various circuit systems for, e.g., illumination, image sensing, and signal processing, operate, the load becomes heavy, and the battery voltage is low. In the audio reproduction state, since only the circuit system for audio reproduction processing becomes a load, the load is lighter than that in the scan state.

Furthermore, in the scan state, owing to the operation sequence for the above circuit systems, a large change in current consumption instantaneously occurs.

That is, since the load in a code reading apparatus like the present invention greatly changes with time as compared with an apparatus like the camera disclosed in Jpn. Pat. Appln. KOKAI Publication No. 3-253828, the consumption state of the battery cannot be satisfactorily detected by a method like the one disclosed in this reference.

As described above, in a code reading apparatus of this type, the current consumption changes due to the contents of a sequence of processing, from scanning of a code to reproduction/output of audio information or the like, and hence the battery voltage changes in a time series manner.

Owing to such a special circumstance, an intended object cannot be achieved by the simple method of detecting a battery voltage upon power-on as shown in FIG. 10 or the method disclosed in Jpn. Pat. Appln. KOKAI Publication No. 3-253828.

BRIEF SUMMARY OF THE INVENTION

The present invention has been made in consideration of the above situation, and has as its object to provide a power-saving code reading apparatus using a sequence in which the supply voltage of a power supply circuit system including a battery changes in a time series manner, which apparatus includes an optimal battery voltage detection function capable of always detecting the consumption state of a battery voltage with high precision and giving the user a warning.

In order to achieve the above object, according to the first aspect of the present invention, there is provided a code reading apparatus comprising:

illumination means for illuminating a code on a recording medium, on which data about audio information is recorded as an optically readable code, by repeatedly emitting light at predetermined intervals;

image sensing means for receiving each of light beams reflected by the recording medium including the code illuminated by the illumination means in a read/scan operation for the code, and outputting a corresponding image sensing signal;

signal processing means for decoding the data about the audio information by processing the image sensing signal output from the image sensing means;

reproduction output means for reproducing the audio information on the basis of the data decoded by the signal processing means and outputting the information;

supply voltage detection means for detecting a supply voltage to a power supply circuit system including a battery used as a power supply of the apparatus;

a power switch for turning on/off the supply voltage to the power supply circuit system; and detection timing control means for controlling the supply voltage detection means to detect the supply voltage at a predetermined timing in image sensing operation performed by the image sensing means at the time of light emission after the supply voltage to the power supply circuit system is turned on by the power switch and first light emission is performed by the illumination means.

This aspect of the present invention corresponds to the first, second, third, and fourth embodiments to be described later.

According to the first aspect of the present invention, in the code reading apparatus, the load of the battery can be set nearly in the steady state by the first light emission from the illumination means after the switch is turned on, and the consumption state of the battery can be reliably detected. If, for example, an output from a regulator or the power supply terminal of an IC where a supply voltage in the code reading apparatus, other than the battery voltage, reflects the consumption state of the battery, the consumption state of the battery can be reliably detected by monitoring such a supply voltage.

According to the code reading apparatus of the second aspect of the present invention, in the code reading apparatus of the first aspect, the image sensing means includes a solid-state image sensing device for storing signal charge corresponding to the reflected light by setting an exposure interval after unnecessary charge stored in a light-receiving section is removed, and transferring the stored signal charge from the light-receiving section to a light-shielding section after the end of the exposure interval, thereby performing electronic shutter operation, and the detection timing control means controls the supply voltage detection means to detect a supply voltage at a predetermined timing within a predetermined interval constituted by an interval in which the unnecessary charge is removed, the exposure interval, and an interval in which the signal charge is transferred from the light-receiving section to the light-shielding section.

This aspect of the present invention corresponds to the first, second, third, and fourth embodiments to be described later.

The second aspect of the present invention is characterized in that supply voltage detection is performed in the predetermined interval to further ensure the effect of the first aspect.

In the predetermined interval, the load instantaneously becomes heaviest. That is, the supply voltage in the predetermined interval accurately reflects the consumption of the battery. By detecting the supply voltage in this interval, the consumption state of the battery can be accurately detected.

According to the code reading apparatus of the third aspect of the present invention, in the code reading apparatus of the first aspect, the image sensing means includes a solid-state image sensing device for storing signal charge corresponding to the reflected light by setting an exposure interval after unnecessary charge stored in a light-receiving section is removed, and transferring the stored signal charge from the light-receiving section to a light-shielding section after the end of the exposure interval, thereby performing electronic shutter operation, and the detection timing control means controls the supply voltage detection means to detect a supply voltage at a predetermined timing within a predetermined interval between the instant at which an image sensing signal is output from the solid-state image sensing device and a next unnecessary charge removal interval.

This aspect of the present invention corresponds to the first, second, third, and fourth embodiments to be described later.

According to the third aspect of the present invention, supply voltage detection is performed in the predetermined interval to further ensure the effect of the first aspect. In the predetermined interval, the supply voltage gradually changes. Even if, therefore, a voltage detection timing offset occurs, the difference between detected voltages due to the timing offset is small. This allows reliable detection of the supply voltage.

According to the code reading apparatus of the fourth aspect of the present invention, in the code reading apparatuses of the first to third aspects, the power supply circuit system including the battery is inhibited from supplying power to a circuit system associated with the reproduction output means in a read interval including the timing at which the supply voltage detection means detects a supply voltage.

This aspect of the present invention corresponds to the first, second, third, and fourth embodiments to be described later.

The consumption state of the battery is preferably determined by detecting the supply voltage in a state wherein the load becomes the heaviest. From this viewpoint, the supply voltage should be detected while all the circuits are energized. In a code reading apparatus of this type, however, power supply control is performed not to simultaneously energize all the circuits in an operation sequence to save power. For this reason, the code reading apparatus of this aspect is designed to inhibit the power supply circuit system including the battery from supplying power to the circuit system associated with the reproduction output means. This can prevent unnecessary current consumption.

According to the code reading apparatus of the fifth aspect of the present invention, in the code reading apparatuses of the first to third aspects, the detection timing control means controls the supply voltage detection means to detect the supply voltage at a predetermined timing before first emission is performed by the illumination means after the power switch is turned on, and the code reading apparatus further comprises warning means for generating a warning when a difference or ratio between a supply voltage detected by the supply voltage detection means at a predetermined timing before the first emission and a supply voltage detected by the supply voltage detection means at a predetermined timing after the first emission exceeds a predetermined level.

This aspect of the present invention corresponds to the third and fourth embodiments to be described later.

In this aspect, voltage detection is performed by the regulator. If, however, the type of battery is determined in advance, the battery voltage may be directly monitored.

According to the code reading apparatus of the fifth aspect of the present invention, a supply voltage detection means that exhibits great variations in detected voltage, e.g., the A/D converter in the system control section, can be used, and the consumption of the battery can be reliably detected even if the detected voltages vary.

The code reading apparatus of the sixth aspect of the present invention is characterized in that the detection timing control means controls the supply voltage detection means to detect the supply voltage at a predetermined timing in image sensing operation performed by the image sensing means at the time of each of light emission operations after the power switch is turned on and first light emission is performed by the illumination means, and the warning means generates a warning when a difference or ratio between the supply voltage detected by the supply voltage detection means at the predetermined timing before the first light emission and an average of the supply voltages detected by the supply voltage detection means a plurality of number of times exceeds a predetermined level.

This aspect of the present invention corresponds to the fourth embodiment to be described later.

In addition to the effect of the fifth aspect, the sixth aspect of the present invention has the effect of reducing variations in detected voltage, even if noise is produced or the A/D conversion timing slightly shifts, by averaging the values detected a plurality of number of times in the steady state.

This averaging processing may be performed by averaging the values detected a plurality of number of times from the start of scanning or averaging all the values detected in the scan operation.

According to the code reading apparatus of the seventh aspect of the present invention, in the code reading apparatus of the fifth aspect, the detection timing control means controls the supply voltage detection means to detect the supply voltage, a plurality of number of times at a high speed, at a predetermined timing before first light emission is performed by the illumination means after the power switch is turned on, and also controls the supply voltage detection means to detect the supply voltage, a plurality of number of times at a high speed, at a predetermined timing in image sensing operation performed by the image sensing means at the time of light emission after the power switch is turned on and the first light emission is performed by the illumination means, and the warning means generates the warning when a difference or ratio between an average of the supply voltages detected by the supply voltage detection means at the predetermined timing before the first light emission and an average of the supply voltages detected by the supply voltage detection means at the predetermined timing after the first light emission exceeds a predetermined level.

This aspect of the present invention corresponds to the seventh embodiment to be described later.

According to the seventh aspect of the present invention, in the fifth aspect, the supply voltage can be detected while the influences of irregular noise such as power supply switching noise are reduced by detecting the supply voltage a plurality of number of times at a high speed, and a warning can be generated with little variation.

According to the code reading apparatus of the eighth aspect of the present invention, in the code reading apparatus of the seventh aspect, the supply voltage detection means detects the supply voltage to be detected the plurality of number of times at the high speed as digital data, and calculates the average from the digital data detected the plurality of number of times.

This aspect of the present invention corresponds to the seventh embodiment to be describe later.

According to the eighth aspect of the present invention, in the seventh aspect, the supply voltage is A/D-converted and detected a plurality of number of times at a high speed to obtain a plurality of digital data, and the average of the digital data is calculated. With this operation, a level stabilizing circuit such as a capacitor that is required to observe the supply voltage as an analog waveform can be omitted, and the number of circuit components required to generate a warning can be decreased.

According to the code reading apparatus of the ninth aspect of the present invention, in the code reading apparatus of the fifth aspect, the detection timing control means controls the supply voltage detection means to detect the supply voltage at a predetermined timing in image sensing operation performed by the image sensing means at the time of each of a plurality of light emission operations after the power switch is turned on and first light emission is performed by the illumination means, and the warning means generates a warning when any one of differences or ratios between the supply voltage detected by the supply voltage detection means at the predetermined timing before the first light emission and the supply voltages detected by the supply voltage detection means the plurality of number of times exceeds a predetermined level.

This aspect of the present invention corresponds to the eighth embodiment to be described later.

The supply voltage drops in different manners depending on the type of boosting circuit or regulator. When the supply voltage drops with a negative slope in a read interval, a drop in supply voltage cannot be detected at the start of the read interval. The code reading apparatus of this aspect is therefore designed to obtain the difference or ratio between the supply voltage detected before first light emission and each of the supply voltages detected a plurality of number of times after the first light emission so as to detect the supply voltage in the read interval as well. With this operation, in addition to the effect of the fifth aspect, the ninth aspect has the effect of reliably generating a warning even if the supply voltage level starts dropping at some midpoint in the read interval.

According to the code reading apparatus of the 10th aspect of the present invention, in the code reading apparatus of the fifth aspect, the detection timing control means controls the supply voltage detection means to detect the supply voltage at a predetermined timing in image sensing operation performed by the image sensing means at the time of each of a plurality of light emission operations after the power switch is turned on and first light emission is performed by the illumination means, and the warning means generates a warning in accordance with the number of times or the time during which a difference or ratio, of differences or ratios between the supply voltage detected by the supply voltage detection means at the predetermined timing before the first light emission and the supply voltages detected by the supply voltage detection means the plurality of number of times, which exceeds a predetermined level is detected.

This aspect of the present invention corresponds to the ninth embodiment to be described later.

The supply voltage drops in different manners depending on the type of boosting circuit or regulator. When the supply voltage abruptly drops stepwise in a read interval, a drop in supply voltage cannot be detected at the start of the read interval. According to the code reading apparatus of this aspect, therefore, the number of times or the time during which the difference or ratio between the supply voltage detected before the first light emission and each of the supply voltages detected a plurality of number of times after the first emission light exceeds a predetermined level is counted. With this operation, in addition to the effect of the fifth embodiment, the 10th aspect has the effect of reliably generating a warning even if the supply voltage abruptly drops stepwise at some midpoint in the read interval.

According to the code reading apparatus of the 11th aspect of the present invention, in the code reading apparatuses of first to third aspects, the detection timing control means controls the supply voltage detection means to detect the supply voltage at a predetermined timing before first light emission is performed by the illumination means after the power switch is turned on, and the code reading apparatus further comprises power supply inhibition means for inhibiting the power supply circuit system from supplying power to the illumination means and/or the image sensing means when a difference or ratio between the supply voltage detected by the supply voltage detection means at the predetermined timing before the first light emission and the supply voltage detected by the supply voltage detection means at a predetermined timing after the first light emission exceeds a predetermined level.

This aspect of the present invention corresponds to the fifth embodiment to be described later.

According to the 11th aspect of the present invention, when the supply voltage extremely drops, the system control section detects the level before the occurrence of an operation error, and inhibits supply of power to the illumination means and the image sensing means which are heavy loads. This suppresses further consumption of the battery and can prevent an operation error in the system control section.

According to the code reading apparatus of the 12th aspect of the present invention, in the code reading apparatus of the 11th aspect, the detection timing control means controls the supply voltage detection means to detect the supply voltage at a predetermined timing in image sensing operation performed by the image sensing means at the time of each of light emission operations after the power switch is turned on and first light emission is performed by the illumination means, and the power supply inhibition means inhibits the supply of power when a difference or ratio between the supply voltage detected by the supply voltage detection means at the predetermined timing before the first light emission and an average of the supply voltages detected by the supply voltage detection means a plurality of number of times exceeds a predetermined level.

This aspect of the present invention corresponds to the sixth embodiment to be described later.

According to the 12th aspect of the present invention, in the first aspect, by averaging the values detected a plurality of number of times in the steady state, variations in detected value can be reduced, and inhibition of power supply can be reliably performed when noise is produced or the A/D conversion timing slightly shifts.

This averaging processing may be performed by averaging the values detected a plurality of number of times from the start of scanning or averaging all the values detected during scanning.

According to the code reading apparatus of the 13th aspect of the present invention, in the code reading apparatus of the 11th aspect, the detection timing control means controls the supply voltage detection means to detect the supply voltage, a plurality of number of times at a high speed, at a predetermined timing before first light emission is performed by the illumination means after the power switch is turned on, and also controls the supply voltage detection means to detect the supply voltage, a plurality of number of times at a high speed, at a predetermined timing in an image sensing operation performed by the image sensing means at the time of light emission after the power switch is turned on and the first light emission is performed by the illumination means, and the power supply inhibition means inhibits the supply of power when a difference or ratio between an average of the supply voltages detected by the supply voltage detection means at the predetermined timing before the first light emission and an average of the supply voltages detected by the supply voltage detection means at the predetermined timing after the first light emission exceeds a predetermined level.

This aspect of the present invention corresponds to the seventh embodiment to be described later.

In addition to the effect of the 11th aspect, the 13th aspect of the present invention has the effect of detecting a supply voltage while reducing the influences of irregular noise such as power supply switching noise by detecting the supply voltage a plurality of number of times at a high speed and averaging the detected voltages, thereby inhibiting power supply with little variations.

According to the code reading apparatus of the 14th aspect of the present invention, in the code reading apparatus of the 13th aspect, the supply voltage detection means detects the supply voltage to be detected the plurality of number of times at the high speed as digital data, and calculates the average from the digital data detected the plurality of number of times.

This aspect of the present invention corresponds to the seventh aspect to be described later.

According to the 14th aspect of the present invention, in the 13th aspect, the supply voltage is A/D-converted and detected a plurality of number of times to obtain a plurality of digital data, and the average of the digital data is calculated. With this operation, a level stabilizing circuit such as a capacitor that is required to observe the supply voltage as an analog waveform can be omitted, and the number of circuit components required to inhibit power supply can be decreased.

According to the code reading apparatus of the 15th aspect of the present invention, in the code reading apparatus of the 11th aspect, the detection timing control means controls the supply voltage detection means to detect the supply voltage at a predetermined timing in image sensing operation performed by the image sensing means at the time of each of a plurality of light emission operations after the power switch is turned on and first light emission is performed by the illumination means, and the power supply inhibition means inhibits the supply of power when any one of differences or ratios between the supply voltage detected by the supply voltage detection means at the predetermined timing before the first light emission and the supply voltages detected by the supply voltage detection means the plurality of number of times exceeds a predetermined level.

This aspect of the present invention corresponds to the eighth embodiment to be described later.

The supply voltage drops in different manners depending on the type of boosting circuit or regulator. When the supply voltage drops with a negative slope in a read interval, a drop in supply voltage cannot be detected at the start of the read interval. The code reading apparatus of this aspect is therefore designed to obtain the difference or ratio between the supply voltage detected before first light emission and each of the supply voltages detected a plurality of number of times after the first light emission so as to detect the supply voltage in the read interval as well. With this operation, in addition to the effect of the 11th aspect, the 15th aspect has the effect of reliably inhibiting power supply even if the supply voltage level starts dropping at some midpoint in the read interval.

According to the code reading apparatus of the 16th aspect of the present invention, in the code reading apparatus of the 11th aspect, the detection timing control means controls the supply voltage detection means to detect the supply voltage at a predetermined timing in image sensing operation performed by the image sensing means at the time of each of a plurality of light emission operations after the power switch is turned on and first light emission is performed by the illumination means, and the power supply inhibition means inhibits the supply of power in accordance with the number of times or the time during which a difference or ratio, of differences or ratios between the supply voltage detected by the supply voltage detection means at the predetermined timing before the first light emission and the supply voltages detected by the supply voltage detection means the plurality of number of times, which exceeds a predetermined level is detected.

This aspect of the present invention corresponds to the ninth embodiment to be described later.

The supply voltage drops in different manners depending on the type of boosting circuit or regulator. When the supply voltage abruptly drops stepwise in a read interval, a drop in supply voltage cannot be detected at the start of the read interval. According to the code reading apparatus of this aspect, therefore, the number of times or the time during which the difference or ratio between the supply voltage detected before the first light emission and each of the supply voltages detected a plurality of number of times after the first emission light exceeds a predetermined level is counted. With this operation, in addition to the effect of the 11th embodiment, the 16th aspect has the effect of reliably inhibiting power supply even if the supply voltage abruptly drops stepwise at some midpoint in the read interval.

According to the 17th aspect of the present invention, there is provided a code reading method comprising the steps of:

illuminating a code on a recording medium, on which data about audio information is recorded as an optically readable code, by repeatedly emitting light at predetermined intervals;

receiving each of light beams reflected by the recording medium including the code in a read/scan operation for the code, and outputting a corresponding image sensing signal;

decoding the data about the audio information by processing the image sensing signal;

reproducing the audio information on the basis of the data and outputting the information;

detecting a supply voltage to a power supply circuit system including a battery used as a power supply;

turning on/off the supply voltage to the power supply circuit system; and controlling to detect the supply voltage at a predetermined timing in image sensing operation in the step of outputting the image sensing signal at the time of light emission after the supply voltage to the power supply circuit system is turned on and first light emission is performed in the step of illuminating the code.

According to the 17th aspect of the present invention, the same function and effect as those of the code reading apparatus of the first aspect can be obtained.

According to the code reading method of the 18th aspect of the present invention, in the code reading method of the 17th aspect, the step of outputting the image sensing signal includes the step of causing a solid-state image sensing device to store signal charge corresponding to the reflected light by setting an exposure interval after unnecessary charge stored in a light-receiving section is removed, and transfer the stored signal charge from the light-receiving section to a light-shielding section, thereby performing electronic shutter operation, and the step of controlling includes the step of controlling to detect the supply voltage at a predetermined timing within a predetermined interval constituted by an interval in which the unnecessary charge is removed, the exposure interval, and an interval in which the signal charge is transferred from the light-receiving section to the light-shielding section.

According to the 18th aspect of the present invention, the same function and effect as those of the code reading apparatus of the second aspect can be obtained.

According to the code reading method of the 19th aspect of the present invention, in the code reading method of the 17th aspect, the step of outputting the image sensing signal includes the step of causing a solid-state image sensing device to store signal charge corresponding to the reflected light by setting an exposure interval after unnecessary charge stored in a light-receiving section is removed, and transfer the stored signal charge from the light-receiving section to a light-shielding section after the end of the exposure interval, thereby performing electronic shutter operation, and the step of controlling includes the step of controlling to detect the supply voltage at a predetermined timing within a predetermined interval between the instant at which an image sensing signal is output from the solid-state image sensing device and a next unnecessary charge removal interval.

According to the 19th aspect of the present invention, the same function and effect as those of the code reading apparatus of the third aspect can be obtained.

According to the code reading method of the 20th aspect of the present invention, in the code reading methods of the 17th, 18th, and 19th aspects, the code reading method is characterized by further comprising the step of inhibiting the power supply circuit including the battery from supplying power to a circuit system associated with reproduction and output of the audio information in the step of outputting the image sensing signal during a read/scan interval for the code, which includes the timing at which the supply voltage is detected in the step of detecting the supply voltage.

According to the 20th aspect of the present invention, the same function and effect as those of the code reading apparatus of the fourth aspect can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A to 2G are timing charts showing changes in supply voltage in the code reading apparatus according to the first embodiment of the present invention;

FIG. 5 is a block diagram showing the arrangement of a code reading apparatus according to the third embodiment of the present invention;

FIGS. 6A and 6B are timing charts showing the voltage detection timings of a code reading apparatus according to the fourth embodiment of the present invention;

FIG. 7 is a flow chart showing the flow of the operation of a code reading apparatus according to the seventh embodiment of the present invention;

FIGS. 8A to 8C are timing charts showing the relationship between the supply voltage, the emission pulse timing, and the supply voltage detection timing in the code reading apparatuses according to the eighth and ninth embodiments of the present invention;

DETAILED DESCRIPTION OF THE INVENTION

Figure 1:
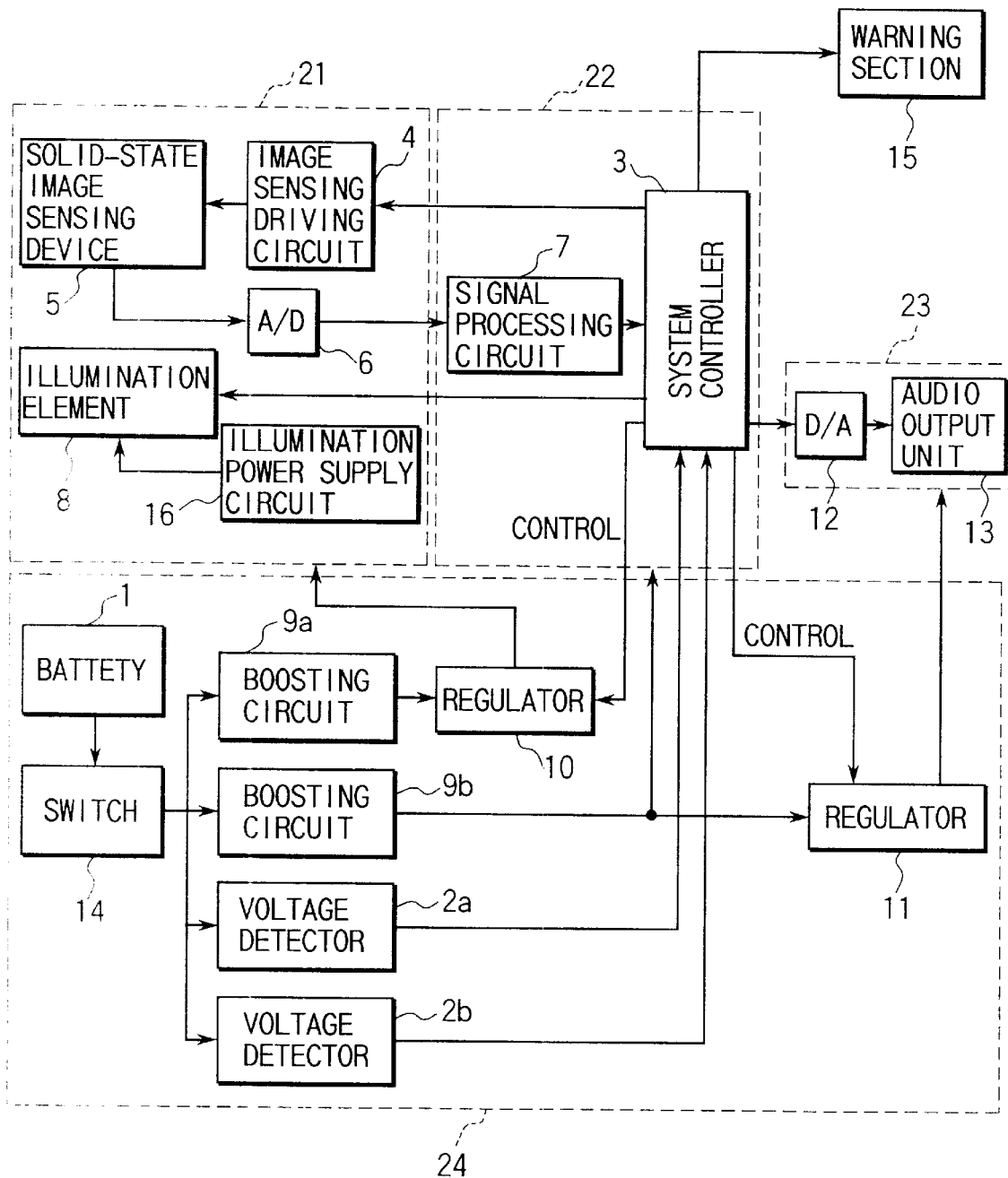
FIG. 1 is a block diagram showing the arrangement of a code reading apparatus according to the first embodiment of the present invention.

Reference will now be made in detail to the presently preferred embodiments of the invention as illustrated in the accompanying drawings, in which like reference characters designate like or corresponding parts throughout the several drawings.

Embodiments of the present invention will be described below with reference to the views of the accompanying drawing.

(First Embodiment)

FIG. 1 is a block diagram showing a code reading apparatus according to the first embodiment of the present invention.

The code reading apparatus of the first embodiment is mainly made up of an image sensing section 21, a signal processing section 22, an audio output section 23, and a power supply section 24.

More specifically, this embodiment has the following arrangement.

After a power switch 14 in the power supply section 24 is turned on, boosting circuits 9a and 9b operate upon reception of power from a battery 1. As a result, a supply voltage is supplied to a regulator 10, the signal processing section 22, and a regulator 11.

Upon reception of a signal as a scan command from an operating section (not shown), a system controller 3 turns on the regulator 10 to supply power to the image sensing section 21. After the image sensing section 21 is energized, the system controller 3 cancels the standby state of an image sensing driving circuit 4 to drive a solid-state image sensing device 5 as a typical example of an interline or frame transfer CCD.

An illumination power supply circuit 16 generates the supply voltage for an illumination element 8 by boosting the voltage applied from the regulator 10 to the image sensing section 21.

The boosting operation in this case may be performed by using a general charge pump circuit.

The system controller 3 drives the solid-state image sensing device 5 and the illumination element 8 at the same time.

This illumination element 8 performs so-called pulse emission illumination, i.e., emitting light at predetermined intervals to illuminate the code printed/recorded on a recording medium.

By instantaneously emitting illumination light in the form of pulses in this manner, an image that has good contrast and is free from image blur can be obtained even if the code reading apparatus is manually scanned.

The solid-state image sensing device 5 sequentially outputs dot code image data, obtained with repeatedly emitted pulse illumination light, to an A/D (Analog/Digital) converter 6 in units of frames.

The A/D converter 6 sequentially converts the dot code image data into a digital signal in units of frames, and outputs the digital signal to a signal processing circuit 7 for performing binarization, demodulation, de-interleaving, error correction, and the like.

The data processed/decoded by the signal processing circuit 7 is stored in a memory (not shown) and is sequentially decompressed and converted into audio data.

Since this conversion processing is described in detail in Jpn. Pat. Appln. KOKAI Publication No. 6-231466 (EP No. 0,670,555A1), a description thereof will be omitted.

In this embodiment, reproduction is started after scanning is complete.

The system controller 3 turns off the power to the image sensing section 21 and turns on the regulator 11 to supply power to the audio output section 23.

The audio output section 23 receives the digital audio output from the system controller 3 and converts it into an analog audio signal through a D/A (Digital/Analog) converter 12. The audio output section 23 then supplies this analog audio signal to an audio output unit 13 such as an earphone.

The supply voltage of the battery 1 is detected by voltage detectors 2a and 2b.

More specifically, the voltage detector 2a detects a voltage level at which a warning should be given to the user. The voltage detector 2b detects a voltage level at which the circuit is stopped to prevent an operation error.

The outputs from these voltage detectors 2a and 2b are input to the system controller 3.

Upon reception of the output from the voltage detector 2a, the system controller 3 drives a warning section 15 to generate a warning by a sound or display. Upon reception of the output from the voltage detector 2b, the system controller 3 operates to maintain a standby state even if it receives a scan command.

In this case, the timing at which the system controller 3 receives the outputs from the voltage detectors 2a and 2b is important.

Figure 11A:
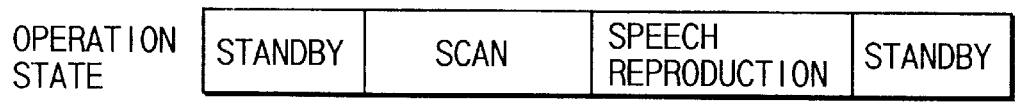
FIGS. 11A and 11B are views showing an operation sequence in a code reading apparatus according to the prior art.
Figure 11B:
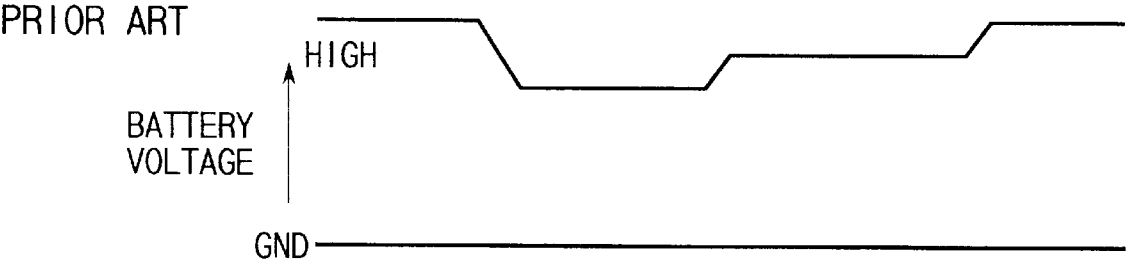

As shown in FIG. 11 described above, the system controller 3 checks outputs from the voltage detectors 2a and 2b during scanning so as to maximize the load in the scanning state.

A rising load and steady load will be described in detail with reference to FIGS. 2A to 2G which show detailed timing charts.

FIG. 2A shows the power-on state of the image sensing section 21. H level indicates the state in which the power to the image sensing section 21 is turned on, i.e., the scanning state.

FIGS. 2B to 2G respectively show the states of a vertical blanking pulse, an illumination pulse, vertical charge transfer, illumination power, image sensing device power, and battery power.

In this case, since the load state is unstable during a power rise period, it is inappropriate for detection of a supply voltage. Hence, a supply voltage is detected after a steady load state is set.

In the illumination circuit system of the image sensing section 21, in particular, a large current flows, although it flows for a short period of time, and the supply voltage is high. The load on this system is therefore heavy.

Furthermore, as shown a dot detection start frame in FIG. 2B, a process for detecting a dot from the image of the dot code is started, after illuminating a plurality of number times of illumination pulses.

At the vertical charge transfer timing in FIG. 2D, the vertical shift register of the solid-state image sensing device discharges unnecessary charge to electronic shutter operation before illumination emission. Thereafter, the load is increased to transfer signal charge.

That is, the timing before and after illumination emission is the timing at which the load is maximized.

FIG. 2F shows the supply voltage to the image sensing device. Since the load increases at the time of unnecessary charge removal and the time of signal charge transfer as described with reference to FIG. 2D, the supply voltage to this image sensing device dips at these times.

Changes in current consumption due to the operation of the CCD, i.e., changes in supply voltage to the CCD, will be described below with reference to FIGS. 3A and 3B.

Figure 3A:
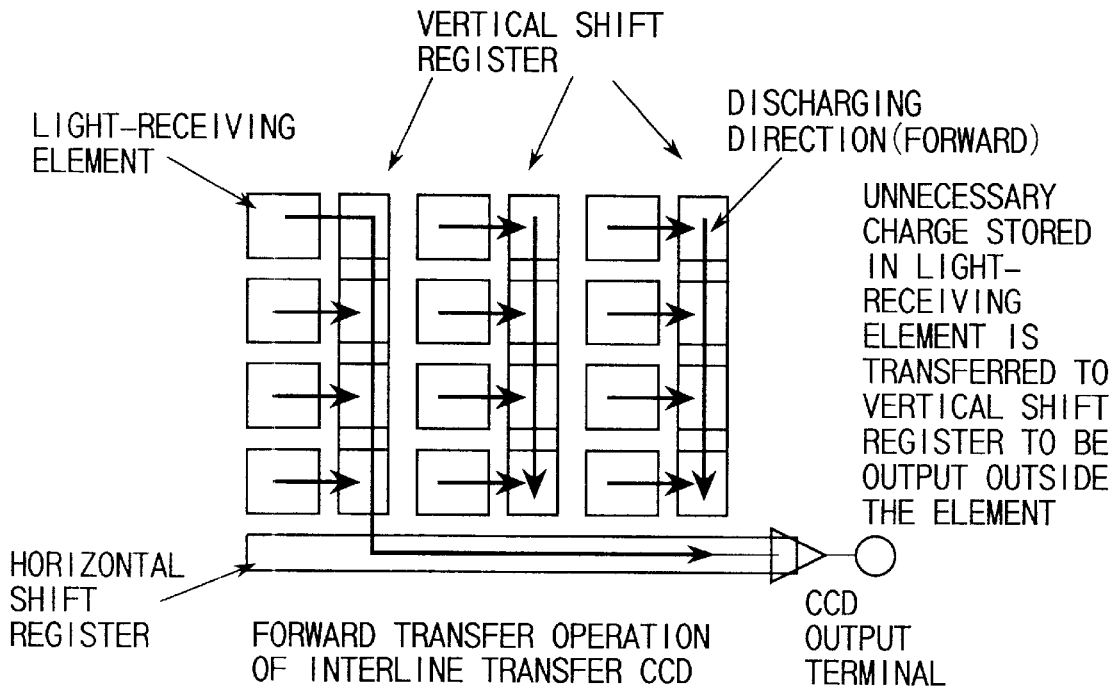
FIGS. 3A and 3B are views showing the structure of a CCD in the code reading apparatus according to the first embodiment of the present invention.
Figure 3B:
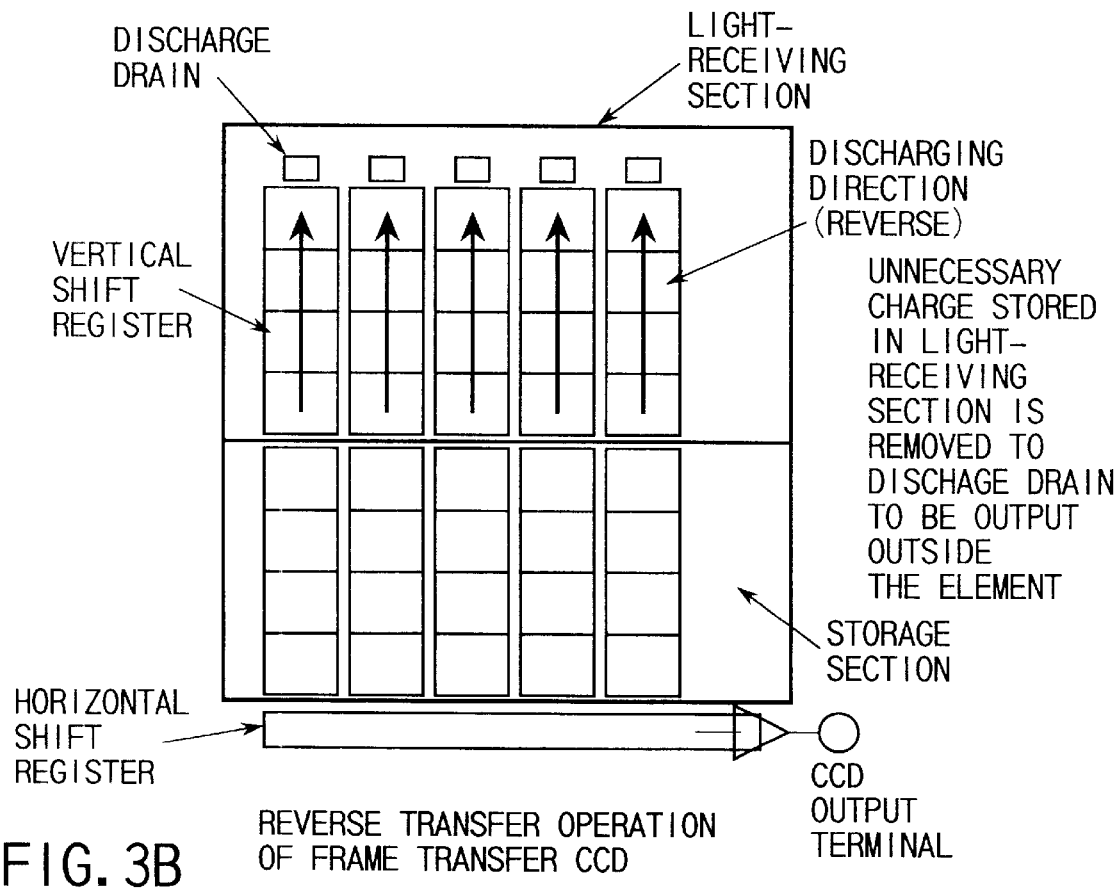

Currently, as solid-state image sensing devices, an interline transfer CCD and a frame transfer CCD are generally used, as shown in FIGS. 3A and 3B.

The interline transfer CCD shown in FIG. 3A is of a forward discharge type, and the frame transfer CCD shown in FIG. 3B is of the reverse charge type.

Since the operations of these CCDs are described in detail in various literatures, a detailed description thereof will be omitted.

Since the frame transfer CCD shown in FIG. 3B has a storage section having the same capacity as that of a light-receiving section, the current consumption of this CCD tends to be larger than that of the interline transfer CCD shown in FIG. 3A which has the same size as that of the CCD in FIG. 3B.

In the frame transfer CCD shown in FIG. 3B, after the unnecessary charge stored in the light-receiving section is removed, an exposure interval is set to store signal charge corresponding to received light, and the stored signal charge is transferred from the light-receiving section to the light-shielding section after the end of the exposure interval, thereby performing electronic shutter operation. The current consumption becomes largest at the time of unnecessary charge removal and the time of signal charge transfer. The current consumptions at these times are almost equal to each other.

In the embodiments of the present invention, the frame transfer CCD shown in FIG. 3B is used, and the supply voltage to the CCD changes as shown in FIG. 2F with time-series changes in current consumption.

FIG. 2E shows the supply voltage to the illumination circuit. The supply voltage to this illumination circuit is higher than the power to the image sensing section 21, and is generated by the illumination power supply circuit 16.

Assume that the current capacity of the illumination power supply circuit 16 is small. In this case, since the load at the time of light emission is heavy, the level of the power changes with variations in load, as indicated by the waveform shown in FIG. 2E.

In addition, as shown in FIG. 2C, the illumination circuit is kept off for a 1-frame period (H level indicates illumination lighting) after power is supplied to the image sensing section.

This operation is performed to quickly start up the illumination power. Since the level of the illumination power at the timing of the first illumination pulse is higher than that in a steady load state, the power at this time cannot be called a steady-stage load. At the timing of the second illumination pulse, however, the illumination power substantially becomes a steady load. If, therefore, a supply voltage is detected at this timing, accurate voltage detection for a steady load state can be performed.

FIG. 2G shows the battery voltage and the detection timings. As described above, this battery voltage changes as shown in FIG. 2G owing to the influences of illumination power and image sensing device power, in particular.

Referring to FIGS. 2A to 2F, two voltage detection timings, namely voltage detection timings 1 and 2, are set. In actual operation, however, one voltage detection timing will suffice.

The reason why voltage detection timing 2 is set at the timing at which the battery voltage becomes lowest is that the voltage varies greatly when the load is maximized, and this reflects the consumption state of the battery 1 most.

Detection at this timing is performed on the precondition that the timings at which the system controller 3 receives outputs from the voltage detectors 2a and 2b do not shift.

The reason why voltage detection timing 1 is set at the timing at which the battery voltage is stable is that since the voltage greatly varies at the time of the maximum load, even a slight difference between the timings at which the system controller 3 receives outputs from the voltage detectors 2a and 2b makes it impossible to perform accurate voltage detection.

Both detection timing 1 and detection timing 2 allow an improvement in the voltage detection precision for the battery 1. Obviously, both the timings can be used.

With the use of this embodiment, even in a system in which the load state changes, the voltage of a battery can be reliably detected, and hence the consumption state of the battery can be detected.

Although the voltage detectors 2a and 2b are used to monitor the battery voltage, the A/D converter incorporated in the system controller 3 may be used as in the third embodiment to be described later.

(Second Embodiment)

Figure 4:
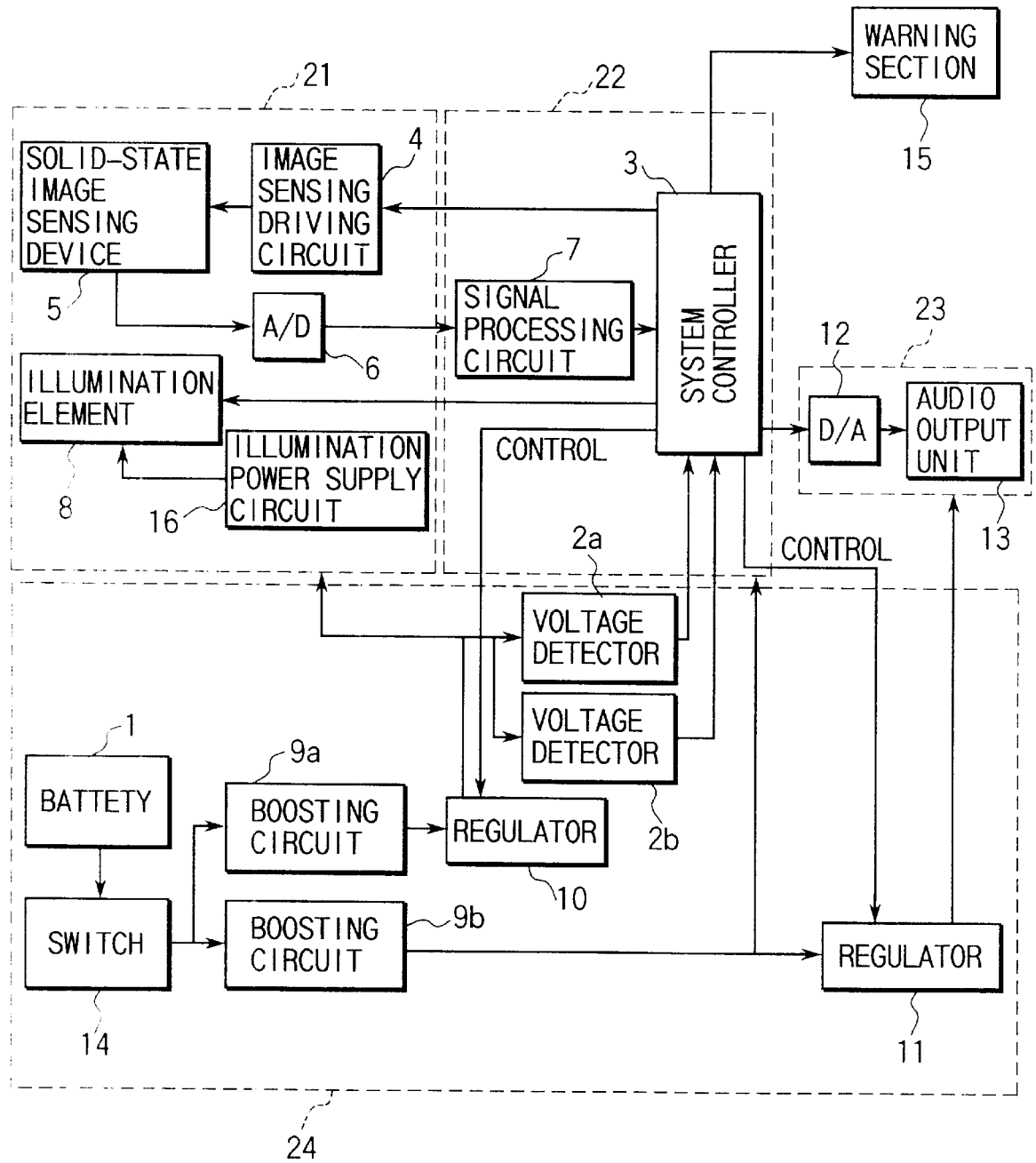
FIG. 4 is a block diagram showing the arrangement of a code reading apparatus according to the second embodiment of the present invention.
Figure 9A:
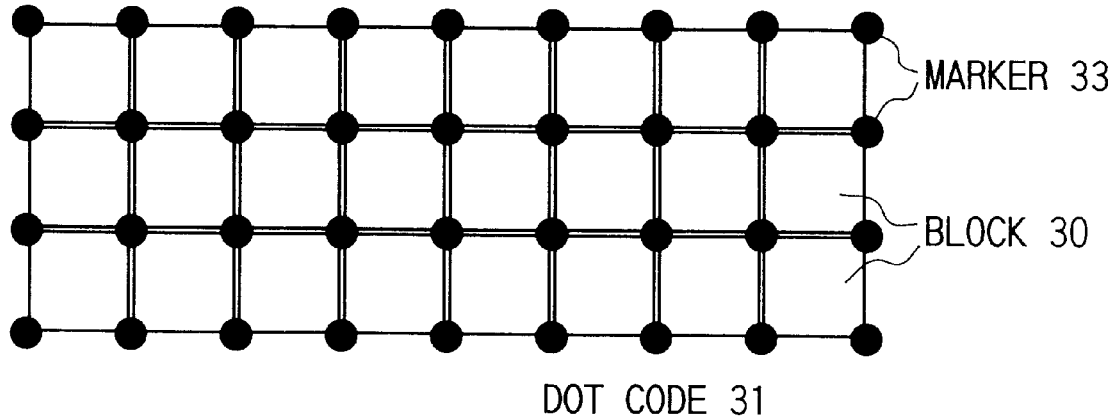
FIGS. 9A and 9B are view showing the arrangement of a dot code according to the prior art.
Figure 9B:
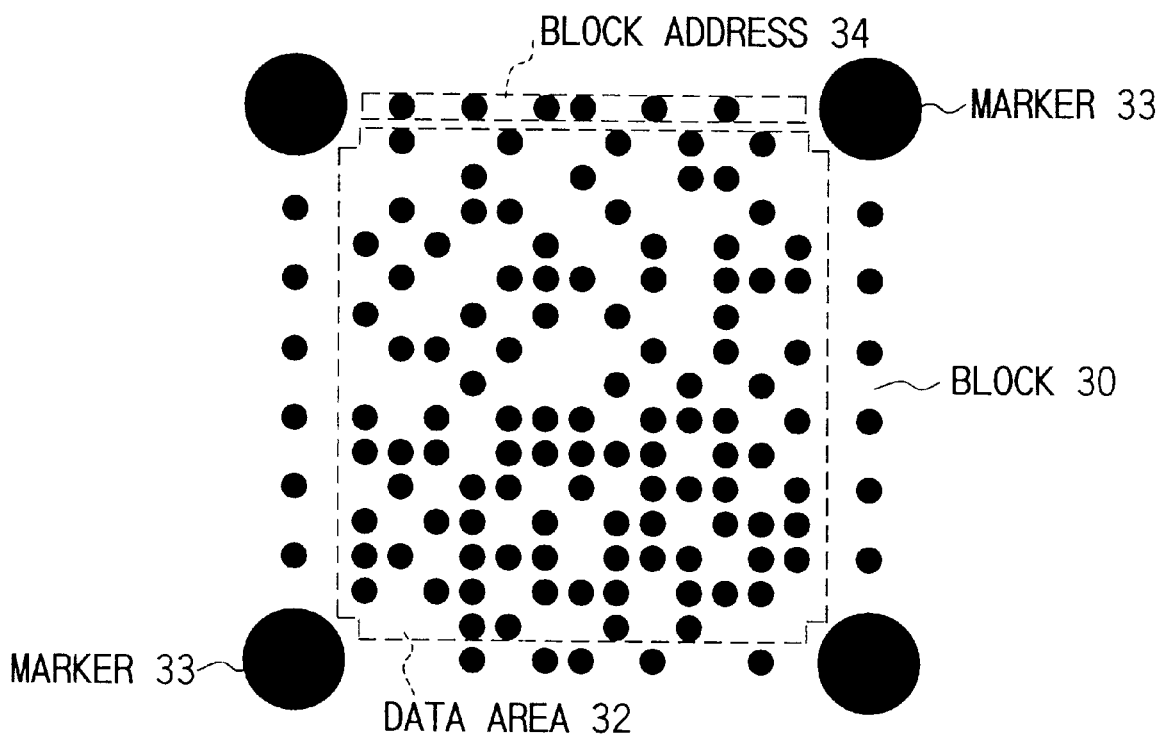
Figure 10:
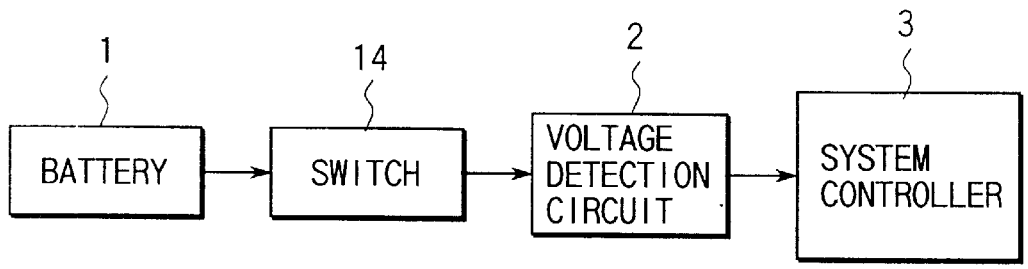
FIG. 10 is a block diagram showing the arrangement of a battery voltage detection circuit in the conventional apparatus.

FIG. 4 shows a code reading apparatus according to the second embodiment of the present invention.

This embodiment has the following arrangement. A description of portions identical to those of the first embodiment will be omitted.

In the second embodiment, the input terminals of voltage detectors 2a and 2b are connected to the output terminal of a regulator 10 to monitor a voltage after stabilization instead of the voltage of a battery 1. However, the detection timing is set in the same manner as in the first embodiment.

The manner in which a battery is consumed, i.e., a change in output voltage with time, depends on the type of battery.

In the case of a dry battery, for example, the voltage gradually drops. The voltage of a Ni—Cd battery, however, the voltage becomes constant at almost 1.2V, and abruptly drops when the battery is consumed greatly.

That is, different types of batteries differ in their manners of consumption and amounts of current that can be consumed even if the battery output voltages are the same. It is an object of this embodiment to reliably detect even the consumptions of different types of batteries.

When a battery is consumed, no current can be supplied. Obviously, if the output current from the battery reduces, and a load cannot be satisfactorily driven, the amount of current supplied to each circuit decreases.

The regulator 10 generally incorporates a reference voltage source. If a necessary amount of current is not supplied from the battery to the regulator 10, the output voltage from the regulator 10 also drops. Therefore, the output voltage from the regulator 10 sufficiently reflects the consumption of the battery.

As described above, a decrease in the output of the regulator 10 indicates a decrease in current supplied from the battery, and reflects the supply current state regardless of the type of battery.

According to this embodiment, the consumption state of a battery can be detected regardless of the type of battery, and hence a warning against battery consumption can be reliably made even if various types of batteries are used.

In addition, if the code reading apparatus incorporates a portion whose voltage changes as a battery is consumed, the same effect as described above can be obtained by monitoring the output of the portion.

(Third Embodiment)

FIG. 5 shows a code reading apparatus according to the third embodiment of the present invention.

This embodiment has the following arrangements. A description of portions identical to those in the first and second embodiments will be omitted.

In the third embodiment, to decrease the cost of the circuit arrangement, the voltage detectors 2a and 2b are omitted, and an analog/digital converter (to be abbreviated as an A/D converter hereinafter) 17 incorporated in a system controller 3 is used to detect a supply voltage.

In this circuit arrangement, an output from a regulator 10 is directly input to the system controller 3.

When the output from the regulator 10 is higher than the supply voltage, the output is voltage-divided, and the resultant voltage is input to the system controller 3.

In this case, a problem is posed in terms of voltage detection precision. Although the detection precision of a commercially available voltage detector varies 2 to 3%, it is difficult to obtain the same precision by using the A/D converter 17 in consideration of the precision of the peripheral circuits such as a reference voltage circuit.

Although the detection precision can be improved by inputting an output from a high-precision voltage generator as an A/D reference to the detector, an inexpensive circuit arrangement cannot be realized.

If an A/D reference is resistance-divided from the power supply to be input to the detector, the detected battery consumption in each product varies due to variations in supply voltage and dividing resistance.

In order to solve the above problem, the supply voltage immediate after the power is turned on is compared with the supply voltage during operation.

FIGS. 6A and 6B show detection timings. More specifically, at timing (a) at which the supply voltage is stabilized after power-on, and which corresponds to a time point before first illumination emission, an output from the regulator 10 is supplied to the A/D converter 17, and a digitally converted battery voltage value is stored in a memory (not shown) to detect a battery voltage.

Subsequently, the supply voltage at timing (b) in a steady load state is detected in the same manner as described above, and a digitally converted battery voltage value is stored in the memory (not shown).

The system controller 3 obtains the difference between the detected voltage at timing (a) and the detected voltage at timing (b), and determines the consumption of the battery 1 on the basis of the difference. When the determined value exceeds a predetermined level, the system controller 3 generates a warning.

In this case, the system controller 3 may determine the battery consumption by obtaining the ratio between the detected voltages instead of the difference. If, for example, the detected voltage at timing (b) exceeds 80% of the detected voltage at timing (a), the system controller 3 determines that the battery 1 is exhausted.

Note that timing (2) may be set at either voltage detection timing 1 or voltage detection timing 2 in the first embodiment.

With the above arrangement, no expensive voltage detector demanding a reference voltage is required, and hence power detection can be realized at low cost.

In this embodiment, an output from the regulator 10 is detected. Even if, however, the voltage of the battery 1 is directly detected, the same effect as described above can be obtained.

(Fourth Embodiment)

A code reading apparatus of the fourth embodiment has the same circuit arrangement as that of the third embodiment in FIG. 5, and hence a description thereof will be omitted.

In the fourth embodiment, the supply voltage at timing (b) in FIG. 6 is detected a plurality of number of times, and the average of the detected values is calculated.

Since the supply voltage at timing (b) is detected during the operation of the circuit, the supply voltage contains irregular noise such as ripples. For this reason, supply voltage detection is performed a plurality of number of times, and the detected values are averaged to reduce irregular noise components.

By comparing the averaged supply voltage at timing (b) with the supply voltage at timing (a), the same effect as that of the third embodiment can be obtained. In addition, a voltage having no irregular noise can be detected.

(Fifth Embodiment)

A code reading apparatus of the fifth embodiment has the same circuit arrangement as that of the third embodiment in FIG. 5, and hence a description thereof will be omitted.

In the fifth embodiment, the ratio between the voltages detected at timing (a) and timing (b) in FIG. 6 is calculated. When the calculated value exceeds a predetermined level, the system controller 3 controls to set a regulator 10 in a standby state through a control line 25, thereby inhibiting the supply of power to an image sensing section 21.

In the code reading apparatuses of the first to fourth embodiments, a drop in supply voltage with consumption of the battery 1 is detected to generate a warning.

If, however, the user of the code reading apparatus neglects the warning and keeps using the apparatus, the supply voltage drops further. As a result, the operation of the image sensing section 21 cannot be guaranteed.

More specifically, since the image sensing section 21 drives a solid-state image sensing device 5 such as a CCD and turns on an illumination element 8 such as an LED, the image sensing section 21 consumes a large amount of current. In addition, this code reading apparatus uses boosting circuits 9a and 9b for boosting a battery voltage because the apparatus uses a high voltage of about 20V as a supply voltage. These boosting circuits 9a and 9b also consume a large amount of current.

If the battery 1 is exhausted, the internal resistance of the battery 1 increases, and a current necessary for the normal operation of the image sensing section 21 cannot be extracted. This makes it impossible to read a code.

If the user keeps using this apparatus in this state, the load on the battery 1 increases, and the battery is quickly exhausted.

As a result, the operations of the system controller 3 that uses a low voltage of about 3V and a warning section 15 cannot be guaranteed. This may lead to inability to give a warning and an operation error in the system controller 3.

According to the code reading apparatus of this embodiment, when a drop in battery voltage is detected, the system controller 3 controls to maintain the regulator 10 in a standby state so as to inhibit the supply of power to the image sensing section 21. In addition to the effects of the first and second embodiments, therefore, this embodiment has the effect of preventing a drop in supply voltage by suppressing abrupt consumption of the battery 1, and preventing an operation error in the system controller.

In this embodiment, the system controller 3 controls to stop the operation of the regulator 10. If, however, the system controller 3 controls to stop the operations of the boosting circuits 9a and 9b, the same effect as described above can be obtained.

In addition, the difference between the voltages detected at timing (a) and timing (b) may be calculated instead of the ratio.

(Sixth Embodiment)

A code reading apparatus of the sixth embodiment has the same circuit arrangement as that of the third embodiment in FIG. 5, and hence a description thereof will be omitted.

In the sixth embodiment, the supply voltage at timing (b) in FIG. 6 is detected a plurality of number of times, and the average of the detected values is calculated. In addition, the ratio between the supply voltage detected at timing (a) and the average of the supply voltages detected at timing (b) a plurality of number of times is calculated. When the ratio exceeds a predetermined level, a system controller 3 controls to set a regulator 10 in a standby state through a control line 25, thereby inhibiting the supply of power to an image sensing section 21.

Since the supply voltage at timing (b) is detected during the operation of the circuit, the supply voltage contains irregular noise such as ripples. For this reason, the detected values are averaged to reduce the influences of irregular noise components.

The averaged supply voltage at timing (b) is compared with the supply voltage at timing (a), and the supply of power is inhibited on the basis of the comparison result, thereby obtaining the same effect as that of the fifth embodiment. In addition, inhibition of power supply can be performed while the influences of irregular noise components are reduced.

Note that the difference between the voltage detected at timing (a) and the average of the supply voltages detected at timing (b) a plurality of number of times may be calculated instead of the ratio.

(Seventh Embodiment)

A code reading apparatus of the seventh embodiment has the same circuit arrangement as that of the third embodiment in FIG. 5, and hence a description thereof will be omitted.

The flow of operation of the code reading apparatus of the seventh embodiment will be described with reference to the flow chart of FIG. 7.

After an illumination power supply circuit 16 is started up by a system controller 3 (step S1), the supply voltage level at timing (a) in FIG. 6 (before an illumination element 8 is actually turned on) is A/D-converted at a high speed, and a plurality of digital data are detected (step S3).

The system controller 3 calculates the average of the plurality of digital data (step S5).

The system controller 3 then turns on the illumination element for the first time (step S7), and A/D-converts the supply voltage level at timing (b) in FIG. 6 at a high speed. The system controller 3 then detects a plurality of digital data again (step S9).

The system controller 3 calculates the average of the plurality of digital data detected in step S9 (step S11).

The system controller 3 compares the average of the digital data detected at timing (a) a plurality of number of times with the average of the digital data detected at timing (b) a plurality of number of times (step S13). If the ratio of these values exceeds a predetermined level, read operation is started (step S15). If the ratio is equal to or lower than the predetermined level, a warning is generated (step S17).

As in the previous embodiments, in this embodiment, the difference between the voltage detected at timing (a) and the average of the supply voltages detected at timing (b) a plurality of number of times may be calculated instead of the ratio.

A supply voltage contains irregular noise such as switching noise. This causes variations in detected voltage. According to the code reading apparatus of this embodiment, however, since the supply voltage is detected a plurality of number of times at a high speed, and the detected values are averaged, the effect of performing supply voltage detection free from the influences of irregular noise components such as switching noise in power can be obtained in addition to the effect of the third embodiment.

In addition, since the supply voltage is detected as a digital value a plurality of number of times, and the detected values are averaged, this apparatus need not use a smoothing capacitor for smoothing an input to the detection circuit, which is required to stabilize a detected voltage as an analog value. This allows reductions in the number of parts and cost.

Note that "high speed" in the present invention indicates that the time required to obtain one average supply voltage is short, and is about several 100 µs to several ms in numerical value. This time is determined by the speed of A/D conversion, the time required for averaging processing, and the like.

In general, it takes several µs to A/D-convert one supply voltage level data into digital data. Assume that it takes 5 µs for this A/D conversion. In this case, if 10 digital data are to be averaged to obtain a supply voltage, one sample can be detected within about 50 µs.

In practice, however, the sample/hold time required to temporarily fix an analog voltage value and the time required for software processing for averaging are added to the above time, it takes several 100 µs to several ms to obtain one sample.

The code reading apparatus of this embodiment generates a warning upon detection of a drop in supply voltage. When the averages of the supply voltages detected at timing (a) and timing (b) in FIG. 6 a plurality of number of times, and the difference or ratio therebetween exceeds a predetermined level, the system controller 3 stops the operation of a regulator 10 through a control line 25, thereby obtaining the same effect as that of the fifth embodiment. In addition, this apparatus can inhibit power supply by accurately detecting a supply voltage with little influences of noise using a circuit with a decreased number of parts.

(Eighth Embodiment)

A code reading apparatus of the eighth embodiment has the same circuit arrangement as that of third embodiment in FIG. 5, and hence a description thereof will be omitted.

In the code reading apparatus of the eighth embodiment, the supply voltage at timing (0) before generation of an emission pulse in FIG. 8C is detected first, and then supply voltage detection is performed a plurality of number of times in synchronism with the emission pulse, as indicated by timing (1), timing (2), . . . The ratio between the voltage at timing (0) and the voltage at each of the subsequent timings is calculated. If any one of these ratios exceeds a predetermined level, a warning is generated.

The manner in which the supply voltage drops varies depending on the types of boosting circuits 9a and 9b and regulator 10. In some case, the supply voltage drops with a negative slope in a read interval, as indicated by supply voltage waveform 1 in FIG. 8A.

Since the supply voltage scarcely drops in the first period of a read interval, a drop in supply voltage cannot be detected by comparing the supply voltage at timing (0) before first light emission with the supply voltage at timing (1) after first light emission (timing (b) in FIG. 6).

According to this embodiment, a warning can be reliably generated by detecting a drop in supply voltage even in a case wherein the supply voltage gradually drops in the second half of a read interval, in which a warning cannot be generated in the third embodiment. More specifically, in the eighth embodiment, a drop in supply voltage is detected in a read interval by detecting the supply voltages at timing (1), timing (2), . . . throughout the read interval, and calculating the ratio between the supply voltage at each timing and the supply voltage at timing (0), thereby reliably generating a warning.

In this case, the ratio between the supply voltage before first light emission and the supply voltage at each of a plurality of timings after light emission is calculated. However, the same effect as described above can be obtained by calculating the differences between these voltages.

The code reading apparatus of this embodiment generates a warning upon detection of a drop in supply voltage. However, this apparatus may compare the supply voltage before first light emission and the supply voltage at a given timing after first light emission, and a system controller 3 may stop the operation of the regulator 10 through a control line 25 when the ratio or difference between the supply voltages exceed a predetermined level. With this operation, the apparatus can reliably detect a drop in supply voltage and inhibit power supply even in a case wherein the supply voltage gradually drops in the second period of a read interval, in which the code reading apparatus of the fifth embodiment cannot inhibit power supply.

(Ninth Embodiment)

A code reading apparatus of the ninth embodiment has the same circuit arrangement as that of third embodiment in FIG. 5, and hence a description thereof will be omitted.

The code reading apparatus of the ninth embodiment perform supply voltage detection a plurality of number of times, as indicated by timing (1), timing (2), . . . in FIG. 8C, and calculates the difference or ratio between each detected voltage and the supply voltage at timing (0). This apparatus then counts the overall number of times of detection and the number of times the difference or ratio between the supply voltages has exceeded a predetermined level by using the counter (not shown) incorporated in a system controller 3. When the ratio between the overall number of times of detection and the number of times the difference or ratio between the supply voltages has exceeded the predetermined level exceeds a predetermined level, the apparatus generates a warning.

The manner in which the supply voltage drops varies depending on the types of boosting circuits 9a and 9b and regulator 10. In some case, the supply voltage abruptly drops stepwise in a read interval, as indicated by supply voltage waveform 2 in FIG. 8B.

In this case, since the supply voltage scarcely drops in the first period of the read interval, a drop in supply voltage cannot be detected, and no warning can be generated by comparing the supply voltage timing (0) before first light emission with timing (1) after first light emission (timing (b) in FIG. 6).

Referring to FIG. 8B, "M" of supply voltage waveform 2 indicates the number of times of supply voltage detection in an interval during which the supply voltage is in a steady state, and "N" indicates the number of times of supply voltage detection in an interval during which the supply voltage drops.

In this state, the code reading apparatus can properly read the code until Mth detection of the supply voltage, but cannot read the code after Mth detection of the supply voltage.

That is, M/(M+N), which is the ratio of the above numbers of times, indicates the ratio at which a read error has occurred in the read interval and the degree to which the read operation is effective.

If this value exceeds a predetermined level, a warning is generated. With this operation, this apparatus can reliably generate a warning even in a case wherein the supply voltage abruptly changes stepwise in a read interval, as indicated by supply voltage waveform 2, in which a warning cannot be generated according to the third embodiment.

In this case, M/(M+N), i.e., the ratio between the numbers of times of detection, is obtained. However, the number of times N may be detected as the difference between (the overall number of times of detection) and (the number of times of detection in a state wherein the supply voltage drops).

In this embodiment, the overall number of times of detection and the number of times of detection in a state wherein the supply voltage drops to a level lower than the predetermined level are counted by the counter. However, the same effect as described above can be obtained by measuring the corresponding times with a timer.

More specifically, a timer (not shown) is set in the system controller 3 to measure the time during which the code is properly read and the time during which the code cannot be read.

The timer is reset to start measuring the time at the timing of power-on in FIG. 8B. When the supply voltage drops to exceed a predetermined level, the timer is reset again. At the same time, the time during which the code is properly read is stored in a memory (not shown).

In addition, the timer is reset again at the timing of power-off, and at the same time, the time during which the code cannot be read is stored in the memory.

The system controller 3 compares with the time measured until the supply voltage exceeds the predetermined level with the time between the instant at which the supply voltage exceeds the predetermined level and the instant at which the power is turned off, thereby generating a warning.

In this embodiment, when a drop in supply voltage is detected, a warning is generated. However, the embodiment may be designed such that the number of times of detection in a state wherein the supply voltage is in a steady state is compared with the number of times of detection in a state wherein the supply voltage drops, and the system controller 3 stops the operation of the regulator 10 through the control line 25 when the difference or ratio between the numbers of times of detection exceeds a given level. With this operation, this embodiment can reliably inhibit power supply even in a state wherein a drop in supply voltage cannot be detected and power supply cannot be inhibited in the fifth embodiment, i.e., a case wherein the supply voltage abruptly drops stepwise in a read interval.

According to the code reading apparatus of the present invention, the consumption state of a battery can always be detected with high precision, and a warning can be given to the user.

As has been described in detail above, according to the present invention, there is provided a power-saving code reading apparatus using a sequence in which the supply voltage of a power supply circuit system including a battery changes in a time series manner, which apparatus includes an optimal battery voltage detection function capable of always detecting the consumption state of a battery voltage with high precision and giving the user a warning.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

We claim:

1. A code reading apparatus comprising:

illumination means for illuminating a code on a recording medium, on which audio information data is recorded as an optically readable code, by repeatedly emitting light at predetermined intervals;

image sensing means for receiving each of light beams reflected by the recording medium including the code illuminated by said illumination means in a read/scan operation for the code, and for outputting a corresponding image sensing signal;

signal processing means for decoding the audio information data by processing the image sensing signal output from said image sensing means;

reproduction output means for reproducing audio information based on the audio information data decoded by said signal processing means, and for outputting the audio information;

supply voltage detection means for detecting a supply voltage to a power supply circuit system including a battery used as a power supply of said apparatus;

a power switch for turning on/off the supply voltage to said power supply circuit system; and detection timing control means for controlling said supply voltage detection means to detect the supply voltage at a predetermined timing in an image sensing operation performed by said image sensing means at a time of light emission after the supply voltage to said power supply circuit system is turned on by said power switch and a first light emission is performed by said illumination means;

wherein said image sensing means includes a solid-state image sensing device for storing a signal charge corresponding to the light beams reflected by the recording medium by setting an exposure interval after an unnecessary charge stored in a light-receiving section is removed, and for transferring the stored signal charge from the light-receiving section to a light-shielding section after the exposure interval ends, thereby performing an electronic shutter operation; and wherein said detection timing control means controls said supply voltage detection means to detect a supply voltage at a predetermined timing within a predetermined interval comprising an interval in which the unnecessary charge is removed, the exposure interval, and an interval in which the signal charge is transferred from the light-receiving section to the light-shielding section.

2. An apparatus according to claim 1, further comprising power supply inhibition means for inhibiting said power supply circuit system including said battery from supplying power to a circuit system associated with said reproduction output means in a read interval including the timing at which said supply voltage detection means detects the supply voltage.

3. An apparatus according to claim 1, wherein said detection timing control means controls said supply voltage detection means to detect the supply voltage at a predetermined timing before the first light emission is performed by said illumination means after said power switch is turned on; and wherein said code reading apparatus further comprises warning means for generating a warning when a difference or ratio between a supply voltage detected by said supply voltage detection means at a predetermined timing before the first emission and a supply voltage detected by said supply voltage detection means at a predetermined timing after the first emission exceeds a predetermined level.

4. An apparatus according to claim 1, wherein said detection timing control means controls said supply voltage detection means to detect the supply voltage at a predetermined timing before the first light emission is performed by said illumination means after said power switch is turned on; and wherein said code reading apparatus further comprises power supply inhibition means for inhibiting said power supply circuit system from supplying power to at least one of said illumination means and said image sensing means when a difference or ratio between the supply voltage detected by said supply voltage detection means at the predetermined timing before the first light emission and the supply voltage detected by said supply voltage detection means at a predetermined timing after the first light emission exceeds a predetermined level.

5. A code reading apparatus comprising:

illumination means for illuminating a code on a recording medium, on which audio information data is recorded as an optically readable code, by repeatedly emitting light at predetermined intervals;

image sensing means for receiving each of light beams reflected by the recording medium including the code illuminated by said illumination means in a read/scan operation for the code, and for outputting a corresponding image sensing signal;

signal processing means for decoding the audio information data by processing the image sensing signal output from said image sensing means;

reproduction output means for reproducing audio information based on the audio information data decoded by said signal processing means, and for outputting the audio information;

supply voltage detection means for detecting a supply voltage to a power supply circuit system including a battery used as a power supply of said apparatus;

a power switch for turning on/off the supply voltage to said power supply circuit system; and detection timing control means for controlling said supply voltage detection means to detect the supply voltage at a predetermined timing in an image sensing operation performed by said image sensing means at a time of light emission after the supply voltage to said power supply circuit system is turned on by said power switch and a first light emission is performed by said illumination means;

wherein said image sensing means includes a solid-state image sensing device for storing a signal charge corresponding to the light beams reflected by the recording medium by setting an exposure interval after an unnecessary charge stored in a light-receiving section is removed, and for transferring the stored signal charge from the light-receiving section to a light-shielding section after the exposure interval ends, thereby performing an electronic shutter operation; and wherein said detection timing control means controls said supply voltage detection means to detect a supply voltage at a predetermined timing within a predetermined interval between an instant at which an image sensing signal is output from said solid-state image sensing device and a next unnecessary charge removal interval.

6. An apparatus according to claim 5, further comprising power supply inhibition means for inhibiting said power supply circuit system including said battery from supplying power to a circuit system associated with said reproduction output means in a read interval including the timing at which said supply voltage detection means detects the supply voltage.

7. An apparatus according to claim 5, wherein said detection timing control means controls said supply voltage detection means to detect the supply voltage at a predetermined timing before the first light emission is performed by said illumination means after said power switch is turned on; and wherein said code reading apparatus further comprises warning means for generating a warning when a difference or ratio between a supply voltage detected by said supply voltage detection means at a predetermined timing before the first emission and a supply voltage detected by said supply voltage detection means at a predetermined timing after the first emission exceeds a predetermined level.

8. An apparatus according to claim 5, wherein said detection timing control means controls said supply voltage detection means to detect the supply voltage at a predetermined timing before the first light emission is performed by said illumination means after said power switch is turned on; and wherein said code reading apparatus further comprises power supply inhibition means for inhibiting said power supply circuit system from supplying power to at least one of said illumination means and said image sensing means when a difference or ratio between the supply voltage detected by said supply voltage detection means at the predetermined timing before the first light emission and the supply voltage detected by said supply voltage detection means at a predetermined timing after the first light emission exceeds a predetermined level.

9. A code reading apparatus comprising:

illumination means for illuminating a code on a recording medium, on which audio information data is recorded as an optically readable code, by repeatedly emitting light at predetermined intervals;

image sensing means for receiving light beams reflected by the recording medium including the code illuminated by said illumination means in a read/scan operation for the code, and for outputting a corresponding image sensing signal;

signal processing means for decoding the audio information data by processing the image sensing signal output from said image sensing means;

reproduction output means for reproducing audio information based on the audio information data decoded by said signal processing means, and for outputting the audio information;

supply voltage detection means for detecting a supply voltage to a power supply circuit system including a battery used as a power supply of said apparatus;

a power switch for turning on/off the supply voltage to said power supply circuit system;

detection timing control means for controlling said supply voltage detection means to detect the supply voltage at a predetermined timing in an image sensing operation performed by said image sensing means at a time of light emission after the supply voltage to said power supply circuit system is turned on by said power switch and a first light emission is performed by said illumination means; and power supply inhibition means for inhibiting said power supply circuit system including said battery from supplying power to a circuit system associated with said reproduction output means in a read interval including the timing at which said supply voltage detection means detects the supply voltage.

10. A code reading apparatus comprising:

illumination means for illuminating a code on a recording medium, on which audio information data is recorded as an optically readable code, by repeatedly emitting light at predetermined intervals;

image sensing means for receiving light beams reflected by the recording medium including the code illuminated by said illumination means in a read/scan operation for the code, and for outputting a corresponding image sensing signal;

signal processing means for decoding the audio information data by processing the image sensing signal output from said image sensing means;

reproduction output means for reproducing audio information based on the audio information data decoded by said signal processing means, and for outputting the audio information;

supply voltage detection means for detecting a supply voltage to a power supply circuit system including a battery used as a power supply of said apparatus;

a power switch for turning on/off the supply voltage to said power supply circuit system; and detection timing control means for controlling said supply voltage detection means to detect the supply voltage at a predetermined timing in an image sensing operation performed by said image sensing means at a time of light emission after the supply voltage to said power supply circuit system is turned on by said power switch and a first light emission is performed by said illumination means;

wherein said detection timing control means controls said supply voltage detection means to detect the supply voltage at a predetermined timing before the first light emission is performed by said illumination means after said power switch is turned on; and wherein said code reading apparatus further comprises warning means for generating a warning when a difference or ratio between a supply voltage detected by said supply voltage detection means at a predetermined timing before the first light emission and a supply voltage detected by said supply voltage detection means at a predetermined timing after the first light emission exceeds a predetermined level.

11. An apparatus according to claim 10, wherein said detection timing control means controls said supply voltage detection means to detect the supply voltage at a predetermined timing in an image sensing operation performed by said image sensing means at a time of each light emission operation after said power switch is turned on and the first light emission is performed by said illumination means; and wherein said warning means generates the warning when a difference or ratio between the supply voltage detected by said supply voltage detection means at the predetermined timing before the first light emission and an average of the supply voltages detected by said supply voltage detection means a plurality of number of times exceeds a predetermined level.

12. An apparatus according to claim 10, wherein said detection timing control means controls said supply voltage detection means to detect the supply voltage a plurality of times at a high speed at a predetermined timing before the first light emission is performed by said illumination means after said power switch is turned on, and also controls said supply voltage detection means to detect the supply voltage a plurality of times at a high speed at a predetermined timing in an image sensing operation performed by said image sensing means at the time of light emission after said power switch is turned on and the first light emission is performed by said illumination means; and wherein said warning means generates the warning when a difference or ratio between an average of the supply voltages detected by said supply voltage detection means at the predetermined timing before the first light emission and an average of the supply voltages detected by said supply voltage detection means at the predetermined timing after the first light emission exceeds a predetermined level.

13. An apparatus according to claim 12, wherein said supply voltage detection means detects the supply voltage to be detected the plurality of times at the high speed as digital data, and calculates the averages from the digital data.

14. An apparatus according to claim 10, wherein said detection timing control means controls said supply voltage detection means to detect the supply voltage at a predetermined timing in the image sensing operation performed by said image sensing means at the time of each of a plurality of light emission operations after said power switch is turned on and the first light emission is performed by said illumination means; and wherein said warning means generates the warning when any one of differences or ratios between the supply voltage detected by said supply voltage detection means at the predetermined timing before the first light emission and the supply voltages detected by said supply voltage detection means the plurality of number of times exceeds a predetermined level.

15. An apparatus according to claim 10, wherein said detection timing control means controls said supply voltage detection means to detect the supply voltage at a predetermined timing in the image sensing operation performed by said image sensing means at the time of each of a plurality of light emission operations after said power switch is turned on and the first light emission is performed by said illumination means; and wherein said warning means generates the warning in accordance with the number of times or the time during which a difference or ratio, of differences or ratios between the supply voltage detected by said supply voltage detection means at the predetermined timing before the first light emission and the supply voltages detected by said supply voltage detection means the plurality of number of times, which exceeds a predetermined level is detected.

16. A code reading apparatus comprising:

illumination means for illuminating a code on a recording medium, on which audio information data is recorded as an optically readable code, by repeatedly emitting light at predetermined intervals;

image sensing means for receiving light beams reflected by the recording medium including the code illuminated by said illumination means in a read/scan operation for the code, and for outputting a corresponding image sensing signal;

signal processing means for decoding the audio information data by processing the image sensing signal output from said image sensing means;

reproduction output means for reproducing audio information based on the audio information data decoded by said signal processing means, and for outputting the audio information;

supply voltage detection means for detecting a supply voltage to a power supply circuit system including a battery used as a power supply of said apparatus;

a power switch for turning on/off the supply voltage to said power supply circuit system; and detection timing control means for controlling said supply voltage detection means to detect the supply voltage at a predetermined timing in an image sensing operation performed by said image sensing means at a time of light emission after the supply voltage to said power supply circuit system is turned on by said power switch and a first light emission is performed by said illumination means;

wherein said detection timing control means controls said supply voltage detection means to detect the supply voltage at a predetermined timing before the first light emission is performed by said illumination means after said power switch is turned on; and wherein said code reading apparatus further comprises power supply inhibition means for inhibiting said power supply circuit system from supplying power to at least one of said illumination means and said image sensing means when a difference or ratio between the supply voltage detected by said supply voltage detection means at the predetermined timing before the first light emission and the supply voltage detected by said supply voltage detection means at a predetermined timing after the first light emission exceeds a predetermined level.

17. An apparatus according to claim 16, wherein said detection timing control means controls said supply voltage detection means to detect the supply voltage at a predetermined timing in an image sensing operation performed by said image sensing means at the time of each light emission operation after said power switch is turned on and the first light emission is performed by said illumination means; and wherein said power supply inhibition means inhibits the supply of power when a difference or ratio between the supply voltage detected by said supply voltage detection means at the predetermined timing before the first light emission and an average of the supply voltages detected by said supply voltage detection means a plurality of times exceeds a predetermined level.

18. An apparatus according to claim 16, wherein said detection timing control means controls said supply voltage detection means to detect the supply voltage, a plurality of times at a high speed at a predetermined timing before the first light emission is performed by said illumination means after said power switch is turned on, and also controls said supply voltage detection means to detect the supply voltage a plurality of times at a high speed at a predetermined timing in an image sensing operation performed by said image sensing means at the time of light emission after said power switch is turned on and the first light emission is performed by said illumination means; and wherein said power supply inhibition means inhibits the supply of power when a difference or ratio between an average of the supply voltages detected by said supply voltage detection means at the predetermined timing before the first light emission and an average of the supply voltages detected by said supply voltage detection means at the predetermined timing after the first light emission exceeds a predetermined level.

19. An apparatus according to claim 18, wherein said supply voltage detection means detects the supply voltage to be detected the plurality of times at the high speed as digital data, and calculates the average from the digital data.

20. An apparatus according to claim 16, wherein said detection timing control means controls said supply voltage detection means to detect the supply voltage at a predetermined timing in an image sensing operation performed by said image sensing means at the time of each of a plurality of light emission operations after said power switch is turned on and the first light emission is performed by said illumination means; and wherein said power supply inhibition means inhibits the supply of power when any one of differences or ratios between the supply voltage detected by said supply voltage detection means at the predetermined timing before the first light emission and the supply voltages detected by said supply voltage detection means the plurality of times exceeds a predetermined level.

21. An apparatus according to claim 16, wherein said detection timing control means controls said supply voltage detection means to detect the supply voltage at a predetermined timing in an image sensing operation performed by said image sensing means at the time of each of a plurality of light emission operations after said power switch is turned on and the first light emission is performed by said illumination means; and wherein said power supply inhibition means inhibits the supply of power in accordance with the number of times or the time during which a difference or ratio, of differences or ratios between the supply voltage detected by said supply voltage detection means at the predetermined timing before the first light emission and the supply voltages detected by said supply voltage detection means the plurality of times, which exceeds a predetermined level is detected.

22. A code reading method comprising the steps of:

illuminating a code on a recording medium, on which audio information data is recorded as an optically readable code, by repeatedly emitting light at predetermined intervals;

receiving light beams reflected by the recording medium including the code in a read/scan operation for the code, and outputting a corresponding image sensing signal;

decoding the audio information data by processing the image sensing signal;

reproducing audio information based on the decoded audio information, and outputting the information;

detecting a supply voltage to a power supply circuit system including a battery used as a power supply;

turning on/off the supply voltage to said power supply circuit system; and controlling detection of the supply voltage at a predetermined timing in an image sensing operation at a time of light emission after the supply voltage to said power supply circuit system is turned on and a first light emission is performed;

wherein a solid-state image sensing device is controlled to store a signal charge corresponding to the light beams reflected by the recording medium by setting an exposure interval after an unnecessary charge stored in a light-receiving section is removed, and to transfer the stored signal charge from the light-receiving section to a light-shielding section, thereby performing an electronic shutter operation; and wherein detection of the supply voltage is controlled to occur at a predetermined timing within a predetermined interval comprising an interval in which the unnecessary charge is removed, the exposure interval, and an interval in which the signal charge is transferred from the light-receiving section to the light-shielding section.

23. A method according to claim 22, further comprising the step of inhibiting said power supply circuit including said battery from supplying power to a circuit system associated with reproduction and output of the audio information during a read/scan interval for the code, which includes the timing at which the supply voltage is detected.

24. A code reading method comprising the steps of:

illuminating a code on a recording medium, on which audio information data is recorded as an optically readable code, by repeatedly emitting light at predetermined intervals;

receiving light beams reflected by the recording medium including the code in a read/scan operation for the code, and outputting a corresponding image sensing signal;

decoding the audio information data by processing the image sensing signal;

reproducing audio information based on the decoded audio information, and outputting the information;

detecting a supply voltage to a power supply circuit system including a battery used as a power supply;

turning on/off the supply voltage to said power supply circuit system; and controlling detection of the supply voltage at a predetermined timing in an image sensing operation at a time of light emission after the supply voltage to said power supply circuit system is turned on and a first light emission is performed;

wherein a solid-state image sensing device is controlled to store a signal charge corresponding to the light beams reflected by the recording medium by setting an exposure interval after an unnecessary charge stored in a light-receiving section is removed, and to transfer the stored signal charge from the light-receiving section to a light-shielding section after the exposure interval ends, thereby performing an electronic shutter operation, and wherein detection of the supply voltage is controlled to occur at a predetermined timing within a predetermined interval between an instant at which an image sensing signal is output from said solid-state image sensing device and a next unnecessary charge removal interval.

25. A method according to claim 24, further comprising the step of inhibiting said power supply circuit including said battery from supplying power to a circuit system associated with reproduction and output of the audio information during a read/scan interval for the code, which includes the timing at which the supply voltage is detected.

26. A code reading method comprising the steps of:

illuminating a code on a recording medium, on which audio information data is recorded as an optically readable code, by repeatedly emitting light at predetermined intervals;

receiving light beams reflected by the recording medium including the code in a read/scan operation for the code, and outputting a corresponding image sensing signal;

decoding the audio information data by processing the image sensing signal;

reproducing audio information based on the decoded audio information, and outputting the information;

detecting a supply voltage to a power supply circuit system including a battery used as a power supply;

turning on/off the supply voltage to said power supply circuit system;

controlling detection of the supply voltage at a predetermined timing in an image sensing operation at a time of light emission after the supply voltage to said power supply circuit system is turned on and a first light emission is performed; and inhibiting said power supply circuit including said battery from supplying power to a circuit system associated with reproduction and output of the audio information during a read/scan interval for the code, which includes the timing at which the supply voltage is detected.

* * * * *